(12) United States Patent
Brinkhus

(10) Patent No.: US 6,425,031 B1
(45) Date of Patent: Jul. 23, 2002

(54) METHOD FOR EXCHANGING SIGNALS BETWEEN MODULES CONNECTED VIA A BUS, AND A DEVICE FOR CARRYING OUT SAID METHOD

(76) Inventor: Hartmut B. Brinkhus, Berghalde 54, D-69126, Heidelberg (DE)

( * ) Notice: Subject to any disclaimer, the term of this patent is extended or adjusted under 35 U.S.C. 154(b) by 0 days.

(21) Appl. No.: 09/367,725
(22) PCT Filed: Dec. 18, 1998
(86) PCT No.: PCT/EP98/08318
§ 371 (c)(1), (2), (4) Date: Nov. 5, 1999
(87) PCT Pub. No.: WO99/32983
PCT Pub. Date: Jul. 1, 1999

(30) Foreign Application Priority Data

Dec. 19, 1997 (DE) .......................... 197 56 885

(51) Int. Cl.[7] .............................. G06F 13/00
(52) U.S. Cl. .................. 710/110; 710/117; 710/124
(58) Field of Search ................ 710/124, 117, 710/110, 111, 112, 113, 114, 115, 116, 119, 122, 123

(56) References Cited

U.S. PATENT DOCUMENTS

| 5,088,024 A | * | 2/1992 | Vernon et al. ............. 710/111 |
| 5,263,163 A | * | 11/1993 | Holt et al. ................. 710/242 |
| 5,301,283 A | * | 4/1994 | Thacker et al. ............ 710/116 |
| 5,623,672 A | | 4/1997 | Popat |
| 5,907,689 A | * | 5/1999 | Tavallaei et al. ........... 710/110 |
| 6,223,237 B1 | * | 4/2001 | McDermid ................. 710/127 |

OTHER PUBLICATIONS

"Time–Division Multiplexed Bus Arbitration," IBM Technical Disclosure Bulletin, Bd. 35, Nr. 3, Aug. 1, 1992, pp. 317–318.

* cited by examiner

Primary Examiner—Peter Wong
Assistant Examiner—Tim Vo
(74) Attorney, Agent, or Firm—Senniger, Powers, Leavitt & Roedel

(57) ABSTRACT

To transfer information between modules which are connected to a common bus, the module that wants to send information sends a request signal via a common bus request line. The module (bus master) which controls the bus activities, receives this signal, sends a command via the bus to all bus users, and thus starts a cycle of clock pulses. A particular clock pulse within a cycle is assigned to each bus user, during which it can send or receive one signal each along one or several predefined bus lines (FIG. 1).

7 Claims, 7 Drawing Sheets

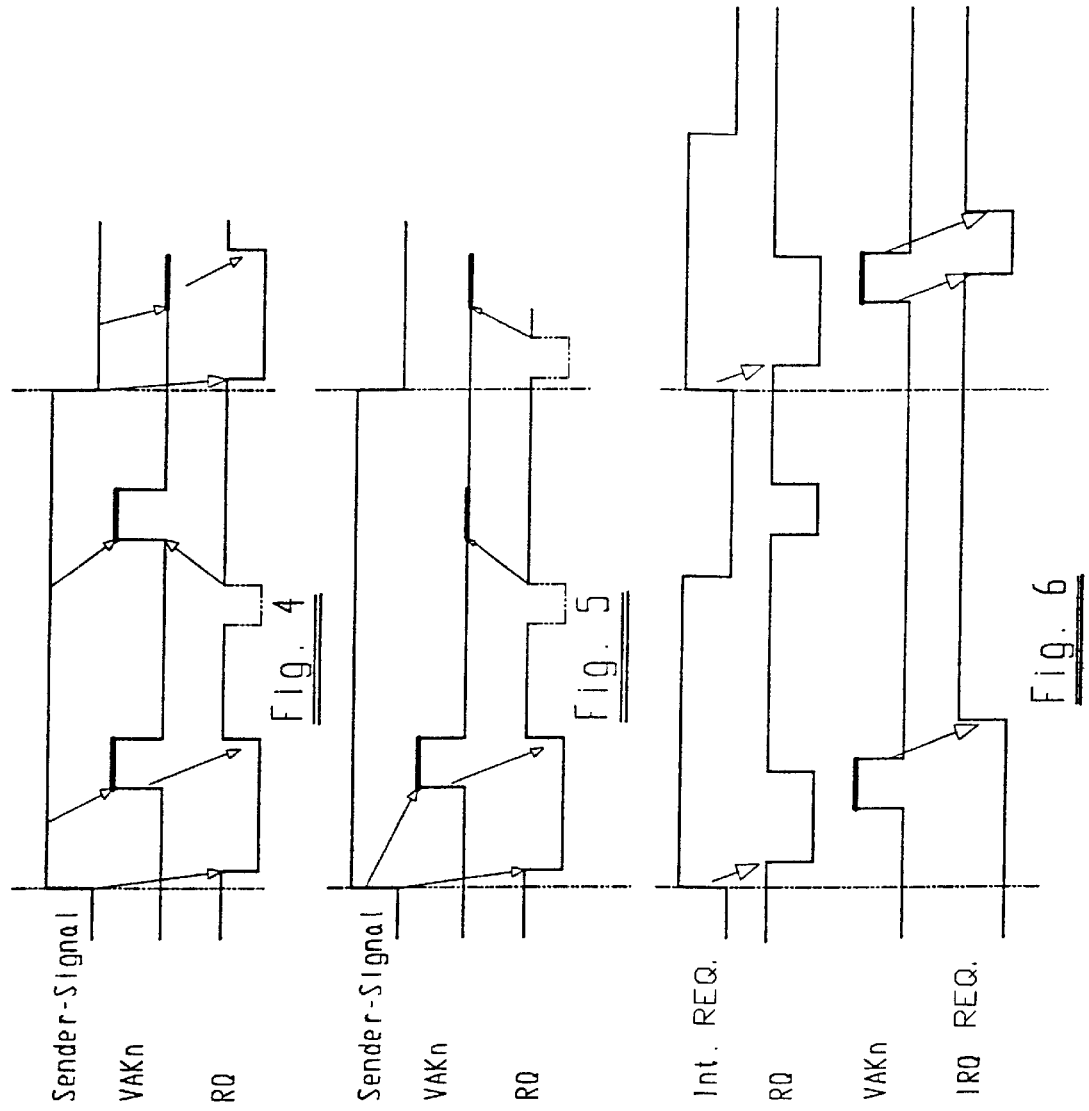

METHOD FOR EXCHANGING SIGNALS BETWEEN MODULES CONNECTED VIA A BUS, AND A DEVICE FOR CARRYING OUT SAID METHOD

BACKGROUND OF THE INVENTION

The invention pertains to a method for the exchange of signals between modules connected via a common bus and to a device for implementation of the method. Conventional computers have several hardware modules which are connected to a common bus, such as the known ISA bus or PCI bus. In order to exchange particular signals between the individual bus users, additional lines are provided for special purposes, such as special interrupt lines, via which individual modules can request an interrupt from the CPU. The number of such lines increases as a function of the number of modules that can request an interrupt. The more complex the system, the more lines are needed, which causes the wiring expense to rise enormously. In addition to the mentioned interrupt lines, in more complicated systems, even more lines are provided for special purposes and for direct exchange of information between individual modules. These lines are hard wired and cannot later be changed or expanded. Thus, the amount of the information that can be passed between individual modules is limited in these known systems.

SUMMARY OF THE INVENTION

The purpose of the present invention is to improve the method and the device of the type discussed above in a thorough manner so that any amount of information can be exchanged between individual modules without additional expense for lines.

This problem is solved by the method with the properties stated in claim 1 and by the device with the properties stated in claim 7. Advantageous configurations and refinements of the invention are presented in the subordinate claims.

The basic principle of the invention concerns the exchange of information via a common bus. For the exchange of information between modules, no dedicated lines are needed for certain signals, such as for interrupts, DMA (direct memory accesses), etc. Bus users (modules) of this kind required to send information request access to the bus (bus request on a single common line), whereupon a clock-controlled cycle is started. This cycle is executed, for example, as an instruction (RAK instruction) and consists of an RAK command that initiates the cycle and of one or more RAK cycles, each having the length of one clock cycle. A predefined period of time of preferably the length of one clock cycle is assigned to each module within which it will send its information over at least one bus line. During this predefined time period, several modules can be addressed simultaneously if different bus lines are assigned to them. It is also possible to allocate several bus lines to one module within one RAK instruction. The individual bus users can also be addressed in temporal succession. The given bus user that has sent the request signal thus sends its information within the time window of the cycle assigned to it via a previously defined line. Each bus user is thus so configured that it can send or receive signals within one or more predetermined time windows. Several bus users can be addressed to act as receivers even within one and the same clock cycle and respective time window. Conversely, a bus user which wants to send different messages to various other bus users can send these messages within one full cycle at different time windows to which the receiver modules are configured.

In general we should mention that the concept of "module" generally pertains to individual bus users, which can be designed as both a plug-in assembly or an IC (chip). Thus, the invention can also be used for the exchange of information between individual chips which are integrated in one assembly, and then these chips can communicate with each other via the bus.

If one bus user has sent a request signal, then the current bus master (e.g., the CPU or another module which is the current bus master) will terminate or interrupt its current bus activity and release the bus for a short time, so that the bus user which has made the bus request can transmit its signals. Then the bus master or another module can again use the bus.

During one such cycle, any number of bus users can send signals within their time window or windows, and during the remaining time segments of the cycle, they can receive signals from other bus users. With the invention, the following advantages, among others, can be realized:

- No additional bus lines are needed besides the request line, and if necessary, one additional control line (RAK).
- Any number of signals can be transmitted.
- All types of signals can be transmitted and not only interrupt requests or DMA transmissions (direct memory access)
- All bus users can transmit signals to all others.
- One bus user can send a signal, for instance, and all others can receive it. For example, higher-order system signals, such as pending voltage loss or occurring bus error, can be signaled to all bus users.
- The connections between the bus users can be configured by software and can be reconfigured at any time. Any expansions, such as in the number of signals, merely require a new software configuration.
- In bus systems that are DMA or bus master capable, the same method can be used. The slight additional load on the bus due to this transmission or due to these transmissions is no longer a considerable matter.
- All bus users are thus each individually connected to each other via the bus. There are no function-related or user-specific lines or any other supplemental lines (with the exception of a request line and perhaps the RAK line).

Each bus user consists of a functional unit and a bus interface, hereinafter called the BIU (for bus-interface unit). The BIU is a circuit used to connect the bus user to the bus. It performs certain activities involving the bus, but without having to involve the functioning unit. For example, if a bus user A or its functional unit determines that the state of a particular signal has changed, then it will report this to its BIU. The BIU has been previously configured so that this change will be reported to one or more bus users (clock timing and line). The BIU of the bus user A will now set the bus-request signal as active (enabled). The bus user B which is currently using the bus or which is allowed to use it is the current bus master. It recognizes the bus request, ends or interrupts its current bus activity, and carries out the following bus activities, wherein the functional unit of the bus master "notices" nothing, except that it cannot use the bus for the moment. The BIU of the current bus master B sends an RAK command (so-called RAK stands for request acknowledge) to the bus or signals it via an additional bus line. All connected BIUs recognize this command, as does the BIU of the bus user A. Next, in accordance with the configuration, one or more so-called RAK cycles (for request acknowledge) will be carried out. If the RAK cycle is at the point for which the bus user A was configured, then its BIU applies the state of the signal to the bus line for which the BIU of A was configured. The bus line is at this time viewed as a virtual interconnection line (VIL) between modules. All other lines leave it unaffected (tri-state). During each RAK-cycle, a number of signals can be transmitted according to the size of the bus. The number of RAK cycles in an RAK instruction is then the number of the defined lines (VIL) divided by the bus size. The bus user A also notices that the change in the signal was transmitted and then ends the process. All other bus users, if appropriately configured, observe these RAK cycles and thus determine whether a signal is being sent to it. If this is the case, then they store the passed information. This concludes the process.

In principle, there are two types of signals to be passed:
1. State of a signal

After every change in the state of the signal, a bus request will be triggered with subsequent RAK instruction. In this case, the current state of the signal will be reported via the bus lines.
2. Change of a signal from logical "0" to logical "1" (rising edge)

If a signal has a rising edge, then a bus request will be triggered with the following RAK instruction. In this case, it will be reported via the bus lines whether the edge has arrived (=1) or not (=0)

For each bus request with following RAK instruction, all signals will always be transmitted. But it is also possible to adjust the number of RAK cycles dynamically, that is, to terminate after the desired signal was transmitted. If a bus request with following RAK cycle is triggered by a third bus user, then in the case of the other signals which are configured for "state," the current state will also be transmitted. With regard to the signals which are configured for "edge," a logical "0" will be passed, i.e., no edge has appeared. Also, several signals from different bus users can initiate a bus request. Then they will be served in a single RAK instruction.

For the RAK cycles it is clear that one and the same RAK cycle within an RAK instruction can be used by several bus users according to the configuration and the bus size. In the RAK cycle of one bus user, one or more lines can be provided, where, in the extreme case, the corresponding bus user uses all bus lines in its RAK cycle, and in this case, only this one bus user will have access to the RAK cycle. In the other extreme case, in which only one line is assigned in an RAK cycle for these configured bus users, as many bus users can transmit in this cycle as there are bus lines available.

With the invention it is also possible to operate a multi-master-capable bus. The determination of the particular master is performed according to the same principle. A bus user that wants to become the new bus master must first fetch the bus. In this case, it will likewise enable the bus-request-line, and the BIU of the still current master will execute an RAK instruction. The new bus master will send a corresponding signal during the cycle assigned to it, via the line assigned to it. If several bus users intend to become new bus masters, then they all place this request on the corresponding bus lines during their assigned cycle. The BIU of the current bus master then determines which ones will obtain the bus. The algorithm for this is programmed and is specified by the configuration master in the initialization phase.

The invention will be explained in greater detail below based on an embodiment example in conjunction with the drawings.

Abbreviations used:
BIU=Bus Interface Unit
CAD=Command/Addresses/Data
CLK=Clock
DMA=Direct Memory Access
IRQ=Interrupt Request
MAK=Master Acknowledge
MRQ=Master Request
RAK=Request Acknowledge
SP-No.=Board slot number
VAK=Virtual Acknowledge
VIL=Virtual Interconnection Line
VRQ=VIL Request
RQ=Request Line

DETAILED DESCRIPTION OF THE INVENTION

Figure 1:
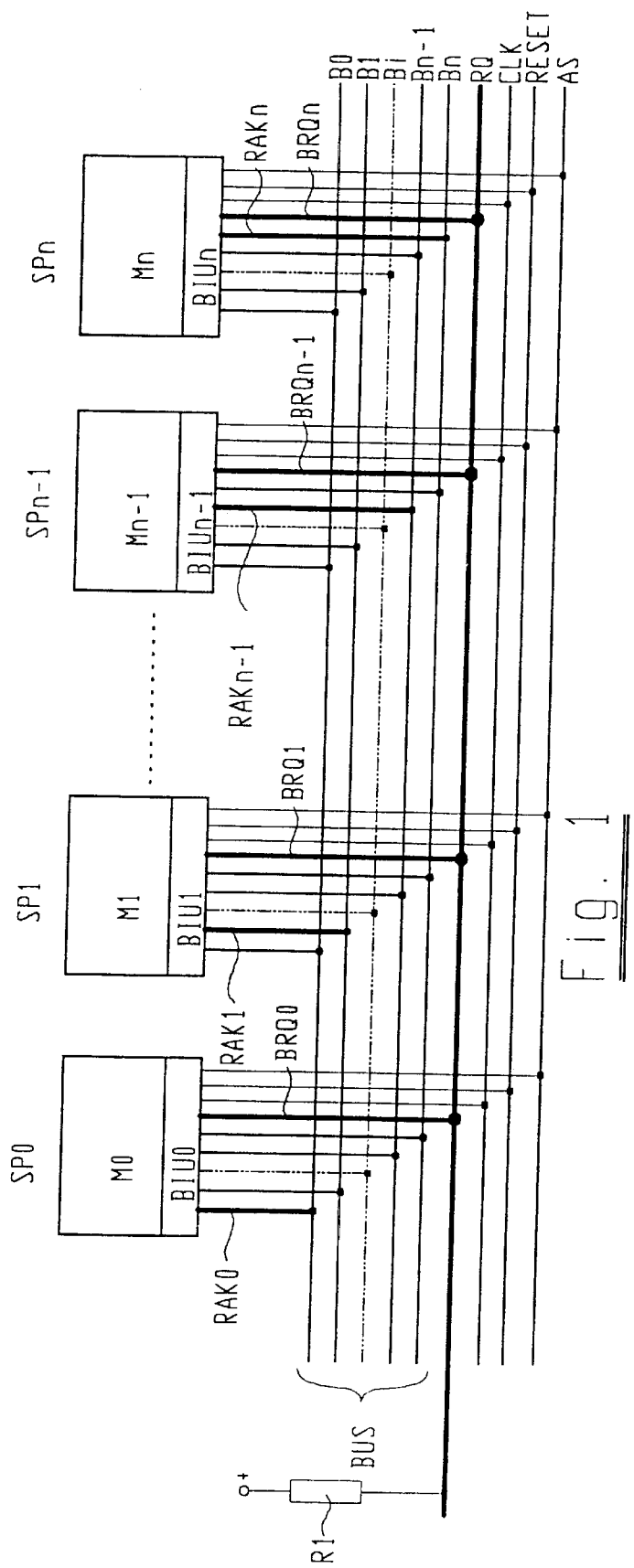
FIG. 1 A block diagram of several modules and several connecting lines

In FIG. 1 there are several modules M0, M1 . . . Mn presented which are connected to board slots SP0, SP1 . . . SPn to one bus with the lines B0 to Bn. In addition, a line RQ (hereinafter, the request line) is provided which is set to positive potential (logical 1) by a pull-up resistor R1 and to which all modules are connected by means of corresponding lines BRQ0, BRQ1 . . . BRQn. In addition, an additional clock line CLK, a reset line RESET and a bus-cycle line AS are shown. Additional lines can be present, but are of no relevance to the invention. The bus can have any given number of lines. In principle, any given number of modules can also be connected.

During normal operation (after the initialization phase) one of the modules is the so-called bus master, which is sending signals in the usual manner along the individual bus lines or is receiving signals from them. If another module which is not the bus master wants to transfer information to one, several, or all modules, then at any particular time it will send along its line BRQ, a bus request signal to the bus request line RQ. This done by applying a logical "0" to this line RQ which is otherwise set to logical "1" by the pull-up resistor R1. The signal BRQ is thus "active low." This can also take place a synchronously to the clock timing on the line CLK. After completion of the currently running bus activity, the current bus master recognizes this request and initiates a request-acknowledge instruction (hereinafter, RAK instruction, standing for request-acknowledge), even if it has nothing to do with the current request.

Figure 2:
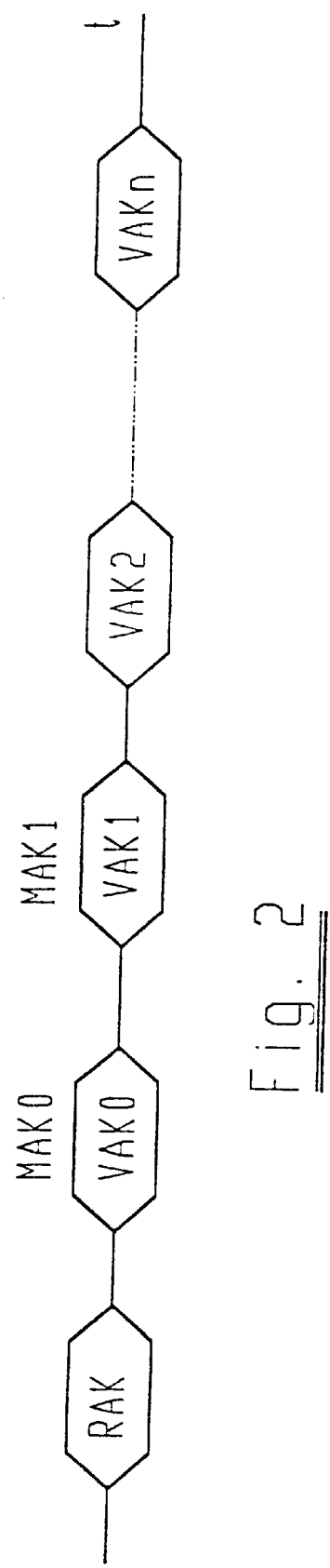
FIG. 2 A timing diagram of one clock cycle

This cycle is illustrated in FIG. 2 and begins with a bus command RAK (for request acknowledge) which is output to any particular number of bus lines B0 . . . Bn, and thus signals all other bus users that now one or more RAK cycles will follow. All modules recognize this bus command and respond to it. After the command RAK, which is actively transmitted by the current bus master to the bus, follow virtual acknowledge cycles (hereinafter called VAK, for virtual acknowledge) VAK0, VAK1 . . . VAKn, which are time periods defined by the clock on the line CLK, wherein the individual VAKs are each separated by a clock pause, when necessary. In these virtual acknowledge cycles, the individual modules can transmit information via the bus, whose lines then no longer have the function of normal bus lines but act as virtual interconnection lines VIL.

Each time window VAK0, VAK1 . . . VAKn defined by a VAK is assigned to one or more modules. For example, the VAKn can be assigned to the module Mn on slot SPn, then when its turn comes up, supply a signal to the bus for one clock cycle on several or all bus lines B0 to Bn. During an RAK instruction, all modules count the clock cycle, and hence the sequence of the individual VAKs, and thus know (according to the initialization phase) when it is their turn to send signals via the bus and also from which module these signals were transmitted. They can read the signals intended for them during the corresponding VAK.

It is possible that several, or even all, modules will send a bus request at the same time. The current bus master will then send out a complete RAK instruction and each module that has sent a bus request can then place its message on the bus line assigned to it, during the time window or cycle assigned to it, that is, during the corresponding VAK.

The description below pertains to a special case of bus distribution among several bus masters which can be carried out by means of the same mechanism.

As is evident from FIG. 2, preferably the first two VAKs (here, VAK0 and VKA1) are reserved for master requests, so-called MAK's, e.g., MAK0, MAK1. This is a special case of the VAK. In general, an MAK is formulated as a special case of a group VIL. Thus, all VILs are combined into one RAK. The senders and receivers are predefined. Relative to the senders, the bus line corresponding to its slot number is assigned to each master, and it places the signal "I want to be master" on this line. Relative to the receiver, all bus users which wish to or must determine the new master, must evaluate all VILs of this RAK cycle. The VILs which are not assigned by a master (e.g., because no master is on the plug-in slot) are marked in the receivers as invalid—relative to MAK. But they can also be used as "normal" VILs.

In one configuration phase, the so-called configuration master determines which slots contain the master modules. In the case of an 8-bit wide bus and 16 bus users, the following process occurs: if a master is located in one of slots 0 to 7, then the corresponding line B0 in VAK0 will be reserved for Master-Acknowledge MAK0; if a master is located in one of slots 8 to 15, then the corresponding line B0 in VAK1 is reserved for MAK1. All lines not occupied by an MAK can then be assigned by virtual interconnection lines VIL. In accordance with the number of possible masters, one or two cycles immediately following the RAK command are executed as so-called Master Acknowledge (MAK cycles). These are reflected in the cycles VAK0 and VAK1. All master-capable modules actively switch their associated bus line RAKx during the MAK cycles and set them to "0" if they have initiated a Master Request (MRQ), or set them to "1" if they have requested no MRQ (x=0 for Master in slot 0, x=1 for slot 1 to x=15 for slot 15). The unassigned lines are masked on each module. Lines can also be open, since potentially no module or no master-capable module is located in any slot. If one of the unmasked lines is set to "0," then in each module it is determined which will be the new master. The old master releases control and the next master assumes control, but it will take effect only starting with the next bus command. During the current RAK instruction, the old master is still in effect. All master modules can determine and store the new master from the code, which is placed on the bus during VAK0 (MAK0) and VAK1 (MAK1), if they want to or need to. It is sufficient for the master-capable module to process and evaluate the information during the MAK cycles. After a change of master, a bus action must be assigned to the new master in every case. An instruction command will be executed in each case. The old master thus cannot immediately become master again. The current master can access the bus without delay by means of bus arbitration, provided no other master has requested the bus.

Since several masters can be located on one bus and all modules can detect the current master, it is possible that in the initialization phase a default can be set in the modules to indicate which masters they are to respond to. During the initialization phase, the addresses, with the modules can be addressed are specified. Thus, two modules can have the same address but be configured for different masters. Thus, a specification of the master will act like an extension of the address. This will be significant, for example, in a bus system with two masters. Each master represents a PC, with the addresses for I/O devices defined for the PC architecture, such as for the printer interface LPT 1. If each of these two PCs is to have a printer interface LPT 1 that is implemented on one module, then there would be a problem because the I/O address of the printer interface would then appear twice in the system. The solution to this problem consists in reporting to each printer module in the initialization phase, in addition to the same I/O address, also the master to which it is assigned, by which it can be addressed. Thus, in one system several equivalent architectures can be implemented which operate in parallel, but via the same bus. The masters can exchange data with each other via other modules addressable by all masters, e.g., common memory areas.

The number of VAK cycles depends on the bus configuration or the number of modules and the number of VILs. In principle, one VAK cycle is provided for each module. One complete RAK instruction need not necessarily contain all VAK cycles, but rather can be interrupted when the last module that has placed a bus request has reached its turn and placed its information. This can be signaled, for example, in that each module that has placed a bus request holds the line RQ at logical "0" until its assigned VAK cycle is completed. If additional modules in the VAK sequence after it have placed a bus request, then they continue to hold the line RQ at logical "0." Thus, one RAK instruction can also be interrupted as soon as the line RQ returns to logical "1," since then all modules will know that no additional VAK cycle can follow. Due to these measures, the transmission time can be saved and the bus will be released earlier for other bus users. VILs which frequently transmit change signals, which therefore release many RAK commands, should preferably be assigned RAK cycles directly at the beginning of the RAK instruction (configured).

To handle the VIL functions, each module has a BIU unit (bus interface unit) that controls the communication between the bus and the module. Each BIU contains a memory or a register which can be written to during a configuration phase, whose VAK cycle is assigned to the particular module, which takes place according to the slot number of the module, for instance. Also, these memories contain a register record for the individual VILs which defines the function of the VIL. Thus, two types of VILs can be distinguished, namely "single VIL" and "group VIL." Whereas only one information message can be passed on one bus line for the single VIL, in the group VIL, all bus lines can be used. But in the group VIL during the individual VAK cycle, only one sender or only one receiver may operate. With regard to the function of the single VIL, every line can be transmitted along any particular virtual line VIL (0 to 7, with 8-bit bus width) in any particular RAK cycle (e.g., 0 to 15).

In a group VIL, the lines of one module are combined into a group, according to the bus width, and transmitted in one RAK-cycle.

For PC architecture, it is useful, for example, for a master module that contains the PC CPU and the interrupt controller or controllers to receive messages concerning all interrupt requests. In this case, a special case of a VAK is used. All interrupt sources then must set the state of their interrupt lines on the bus in the case of a bus request. For simplicity, for example, the interrupt IRQ0 can reside on the line B0 and the interrupt IRQn on the line Bn. In spite of this, the configuration phase can proceed as usual. In the sender, i.e., modules which report the interrupt, the RAK number and the bus line are stated for each interrupt line. At the receiver (in PC architecture, the PC master with interrupt controller) only the RAK number to which the interrupts are delivered need be stated. In the configuration registers of the individual BIUs for the virtual connecting lines the following is specified per VIL:

VIL:
Bit 0 enable/disable the VIL
Bit 1 single/group-VIL
Bit 2 input/output
Bit 3 transfer of the level or edge
Bit 4–7 RAK number for which VIL is transmitted (4 bits)
Bit 8–13 Bus line number on which VIL is transmitted (for single VIL only).
Additional bits can stay reserved.

The named records of the configuration register are described in a configuration phase.

In the RAK instruction after a bus request, the corresponding information with corresponding RAK number is placed on the corresponding bus line. The other lines remain in a so-called tri-state, so that they are enabled and thus can be "driven" by another bus user and thus can be set to logical 0 or 1.

The configuration area, e.g., of an EEPROM, of the module holds the information concerning which type of RAK the function requires and which BIU is assigned to the particular module. It is also specified whether there are any restrictions on the assignment of a VIL to a bus line. Therefore, under certain circumstances, care must be taken in the configuring the request of a VIL to be placed on a particular bus line.

FIG. 3 again shows details of the time sequence. Before time t1 the bus lines are used as CAD lines (for command/addresses/data). At time t1, one of the modules is able to send a signal to at least one other module. At time t1, there is a request signal on the line RQ, and this pulls it to logical "0." The bus master ends its current bus activity at time t2 and outputs the RAK command (request acknowledge) as command in the time interval t2–t3 to the bus. Next comes a pause t3–t4 the length of one clock cycle, for example. At the same time, the bus master sets the line AS to logical "0." This signal tells all bus users that a command (the RAK command, here) is on the bus. All bus users evaluate the signal AS and the command and determine that an RAK instruction is initiated. Based on its configuration, they also recognize the number of VAKs, so that it will be possible for them to track the complete RAK-command. If the configured VAK number has been reached for that particular module which has sent the bus request, for example, the VAK number VAKx at time t6, then this module sends its information during time interval t6–t7 on the bus line or lines, which has the function of VIL lines during this time interval. At the time t7, the same 155 module that has placed the request will in turn remove this request from the line RQ. If no additional module has set a request signal, then the line RQ returns to logical "1." At this time, the RAK command can be interrupted. But it is also possible to run this command fully to the end, down to VAKn in the time interval t8–t9. At time t9, the bus master, or possibly a new bus master, again takes over the bus and can start its activities.

In principle, after every VAK within an RAK instruction, a clock pause is provided in order to allow any needed bus reversal. But it is also possible that no reversal of the bus is needed for sequential VAKS. In this case, the pause can be omitted. Thus, in the configuration area of each BIU, a register can be provided which determines whether the corresponding module can suppress pauses and before which VAKs no pauses need be provided. If all existing modules can suppress these pauses, then during the configuring, the distribution of the VILs can take place in light of this information. The configuration master sets the corresponding register in the BIUs. In this case, an RAK instruction can propagate more quickly.

The number of additional VAK cycles can be user-defined and in principle can be of any size. The individual VIL is defined in the configuration registers of the BIUs. Of course, only as many VAK cycles can be executed as are needed to handle all defined VILs. During a VAK cycle, the modules define one or more output lines for this VAK cycle, switch the configured CAD line active and set it to the current level and edge of the output signal. All modules that have defined an input for this cycle and for this CAD line temporarily store the state of the line and apply it to the corresponding input.

Figure 3:
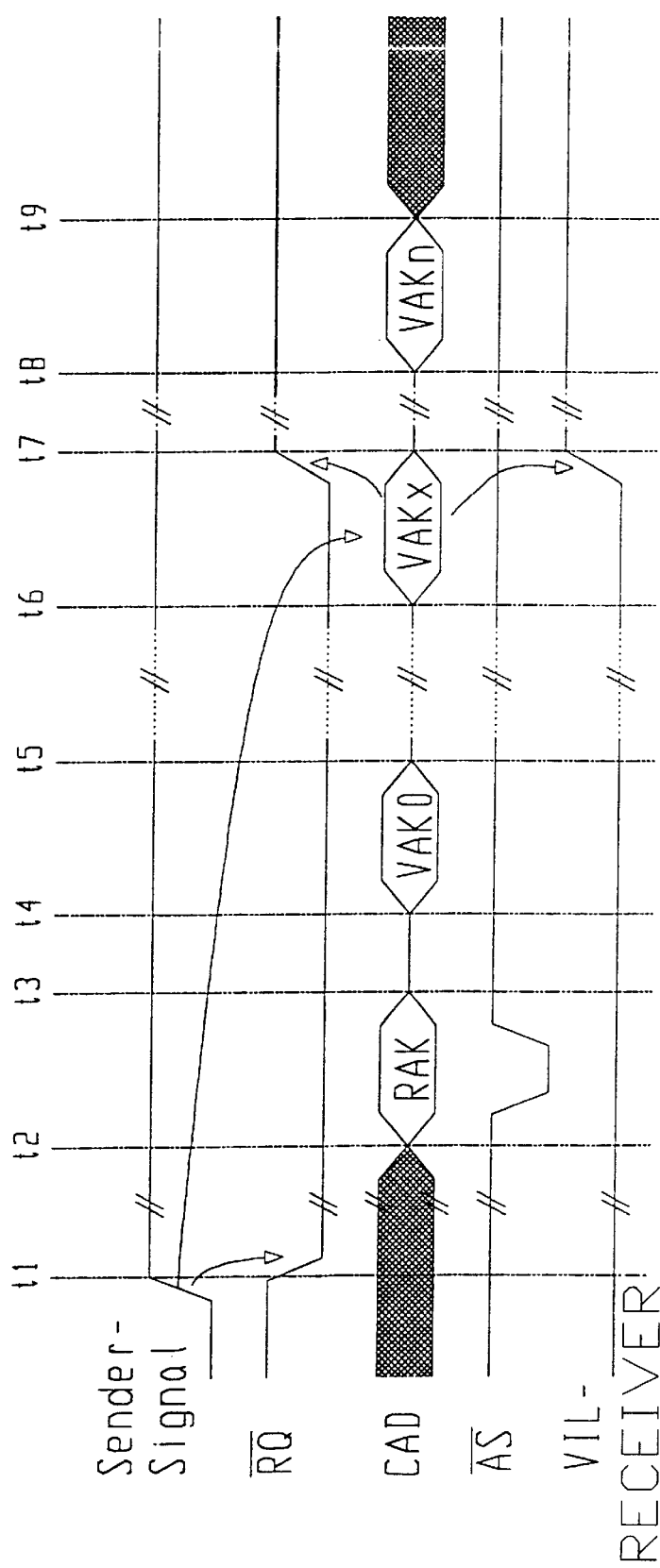
FIG. 3 A timing diagram of one complete clock cycle and also various additional signals FIGS. 4–6 Timing diagrams of signal sequences which are triggered by differing events (changes of state, FIG. 4; signal edge, FIG. 5; interrupt request, FIG. 6)

The signal AS can also be used for another purpose. As shown in FIG. 3, after the RAK command, it can again become inactive (high). But it can also be used to report to the addressed bus user the length of the command or the number of data items. Let us assume an 8-bit wide bus. In the case of a write command, the amount of data is not known to the receiver of the data, which sometimes also applies to a sender that does not yet know at the beginning how much data is to be written in a command. The bus master (CPU) can only intend to transfer, for example, 1 byte, 1 word (=2 bytes), one double word (4 bytes) or even more data in one command. Therefore, it leaves the signal AS active low, as long as it still wants to send data. Before the last written byte, it sets AS inactive high and thus ends the command. During a read access, the master will also indicate via AS how long it intends to read data. In a 16-bit wide bus, when the smallest addressable unit is 1 byte (as usual), then the system can proceed as follows. In every clock cycle, the bus supplies 2 bytes to the receiver for a write command. But the receiver does not know the number of valid bytes actually sent by the sender, which of the two bytes or whether both are valid. This is then solved in that for a write access, the receiver of the data is informed, on the one hand, of the received address (odd or even) and on the other hand, of the number in modulo [2] form in the command. In a 16-bit bus, 1 bit is required for this in the command. The receiver of the data can then determine whether it should use in the last clock cycle of a command only 1 byte (then always the lower) or both bytes. As long as it is not the last clock cycle, which it determined based on AS active low, it will use both bytes. If AS is inactive high, it is the last clock cycle. In an even wider bus, in principle the process is the same, only with 32 bits, for example, 2 bits are needed to pass the number in modulo form in the command.

Otherwise, the signal AS can also be used by the master to indicate to the bus users the premature termination of a command. If the end comes too early for one bus user because its turn will not come until a later RAK cycle, it will have to place a bus request once again.

An additional, special case of a VAK cycle will be initiated by an interrupt request of one module. Also, this will be announced on the line RQ. The corresponding VAK cycle is then defined as the PAK (for PC interrupt acknowledge). For reasons of simplification, all VILs of a VAK are combined and predefined. All VIL inputs of one PAK are localized on a single master. The VIL outputs can be localized on various modules, as for the other VILs. The master is a PC module, for example, and is configured for PC compatibility. During one PAK cycle, the modules that have a PC interrupt line for this master switch the corresponding line to active (enabled) and set it to the desired level. The master temporarily stores the level and passes it along to its PC-compatible interrupt controller. Unused interrupts are masked in the interrupt controller of the master. The unused lines remain in the tri-state mode.

The condition for triggering of a request for a VIL can be specified in the configuration phase. The following possibilities are found:

The level or the state will be passed, and rising and falling edges can trigger a request. This is illustrated in FIG. 4. In the defined VAK cycle, the state of the corresponding channel will always be passed. A request will be triggered for a change in the channel value (edge). The dashed lines in FIG. 4 illustrate a request originating from a different module which is then served in the current RAK cycle at an appropriate time window.

Another possibility consists in triggering the request by one edge (see FIG. 5). Upon the occurrence of a rising edge, in the corresponding VAK cycle a logical "1" will be passed, otherwise a logical "0".

The initiation of a PC interrupt is also possible by means of the VILs. A VIL line is selected for transmission on an interrupt line. All PC interrupts can thus move from various senders during a VAK to the receiver (group VIL) and be kept ready for additional processing by an interrupt controller.

The interrupt controller in PC architectures requests a rising edge on the IRQ line with following positive level for correct execution of the interrupt. In the normal case (PC) the IRQ line will again be set to logical "0" after processing of the IRQ. At the VILs this would lead to the initiation of an additional RAK-cycle, in order to reset the IRQ. In order to eliminate this, an IRQ can be treated according to FIG. 6 by the receiver. The initiation of an IRQ by a VIL will cause the receiver to set his corresponding IRQ register to "0" for a certain time, and then to indicate the IRQ by a rising edge with subsequent high level. Even if the register was not previously reset, the IRQ will be correctly recognized. A reset of the corresponding IRQs is thus no longer necessary.

During the configuration phase the configuration master determines the requests and capabilities of the individual modules. Thus, it is possible for it to describe the VIL register in all configuration areas of the BIUs. For example, if a module A reports the occurrence of an event to a module B via a VIL, then during the configuration, the VAK and CAD number of the VIL in module A (output) must agree with the numbers of the VIL of module B (input). This will ensure that the information is passed at the same time (VAK number) on a defined line (CAD number). The configuration master distributes the VILs so that, on the one hand, there will be no conflicts, and, on the other hand, so that the smallest possible number of VAKs is needed. The number of VAKs is likewise specified in each BIU (configured by the configuration master).

Figure 7:
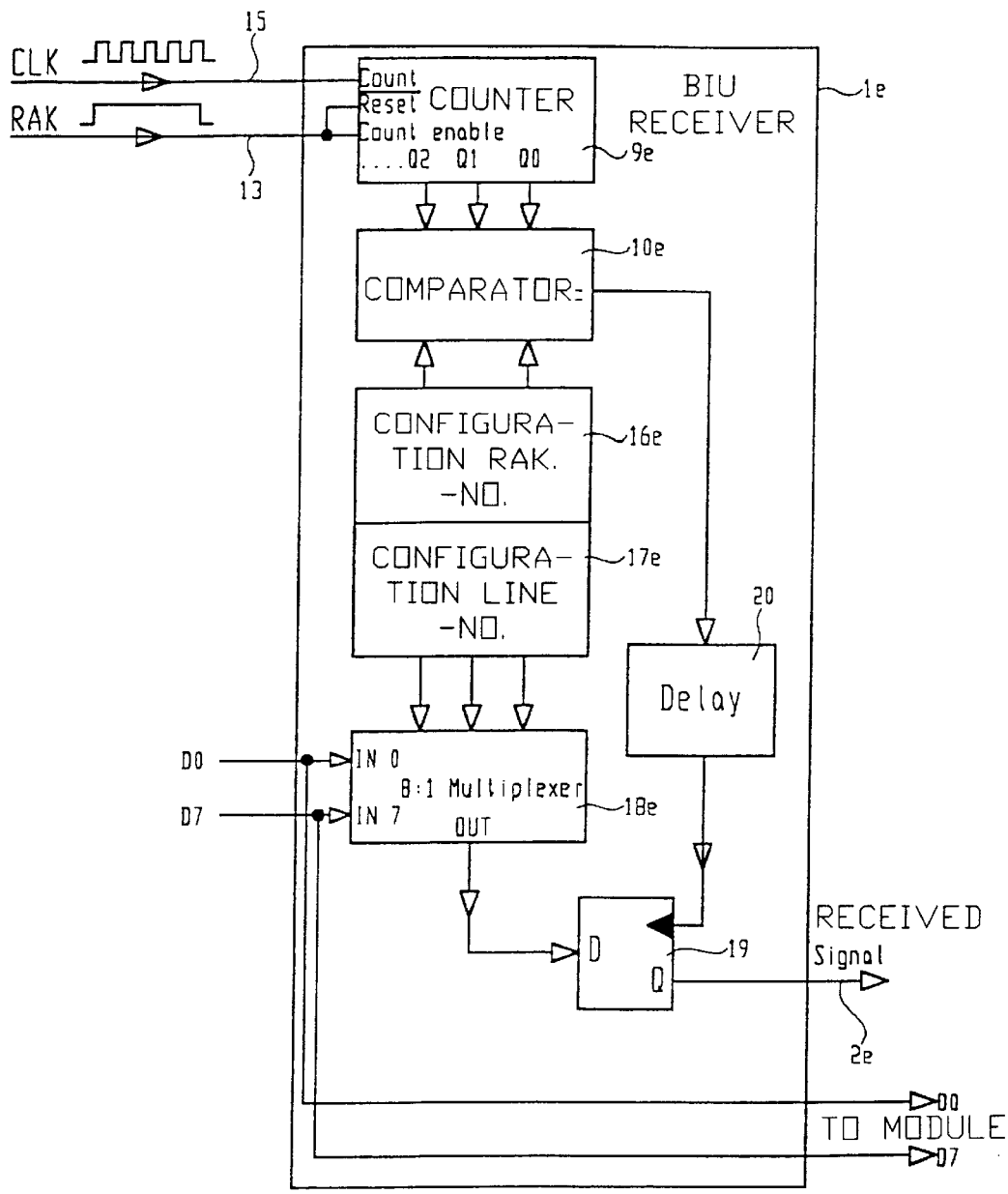
FIG. 7 A basic circuit diagram of a bus interface unit (BIU) for a receiver FIG. 8 A basic circuit diagram of a bus interface unit (BIU) for a master.
Figure 8:
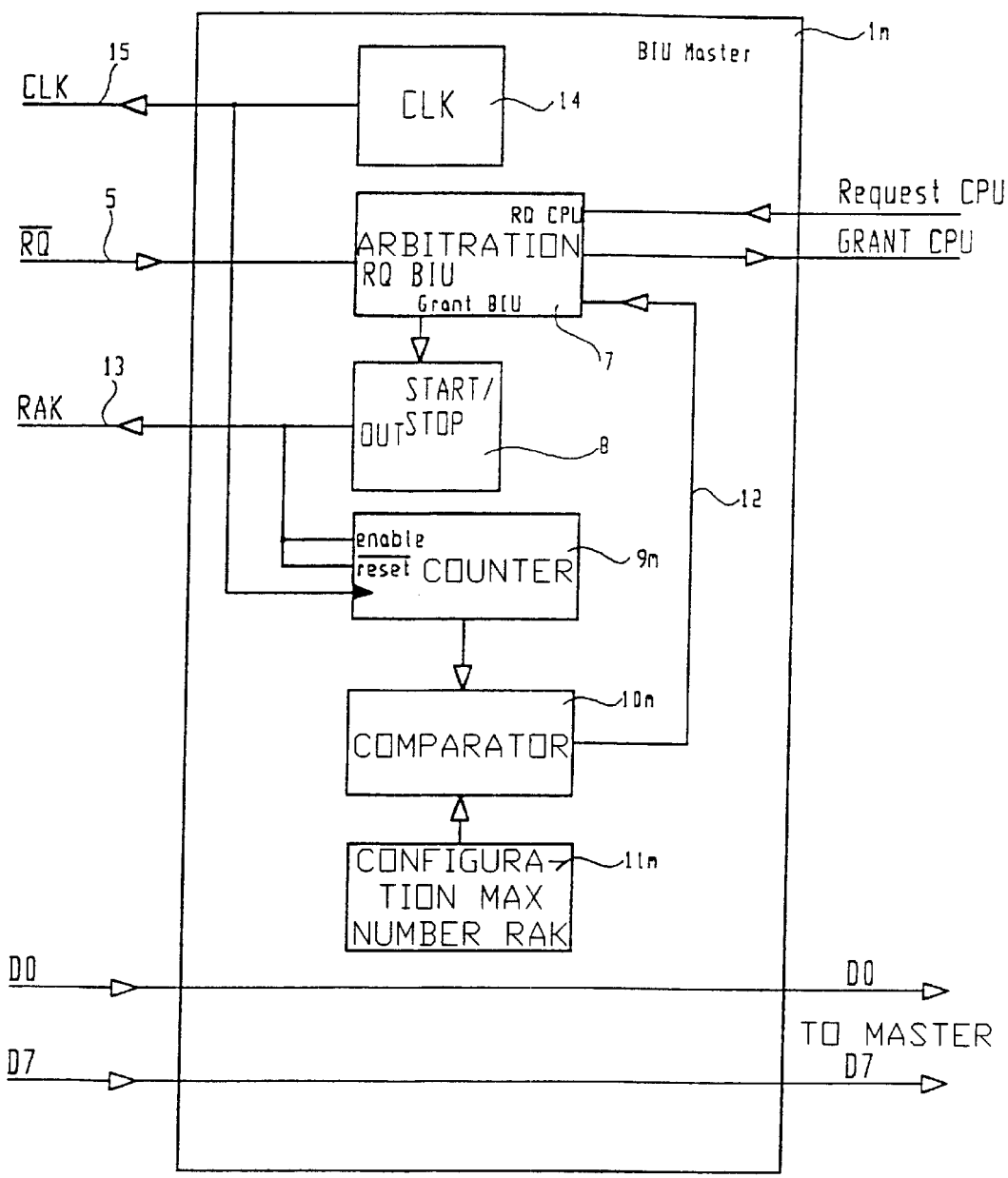
Figure 9:
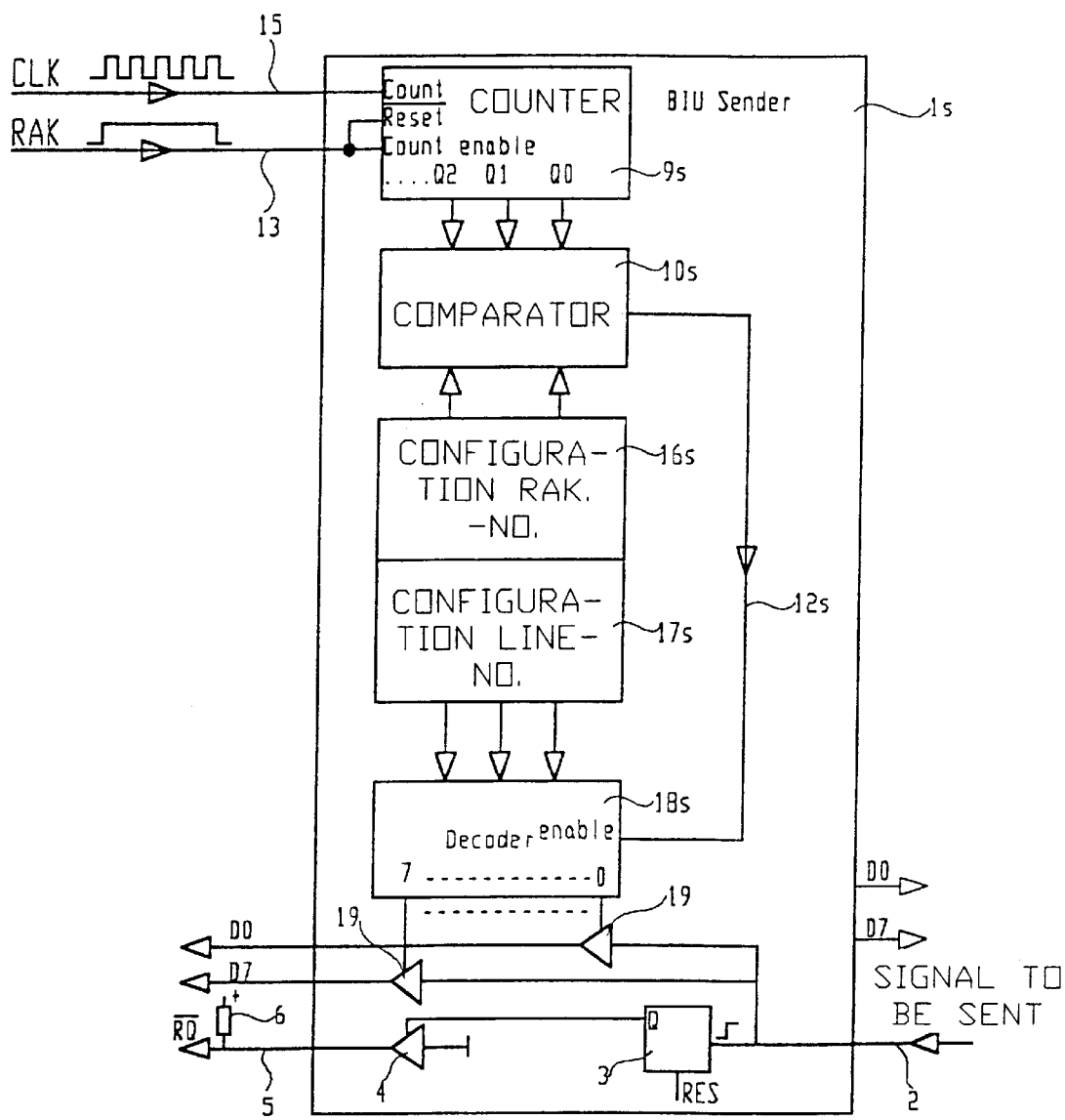
FIG. 9 A basic circuit diagram of a bus interface unit (BIU) for a sender.

FIGS. 7 to 9 show schematic block diagrams of bus interface units (BIU) which are configured for a receiver (FIG. 7), a bus master (FIG. 8), and a sender (FIG. 9). Since each module can normally operate as sender and receiver, it is obvious that the circuits of FIGS. 7 and 9 are contained in each module, so then individual assemblies, such as counters, etc., can of course be used both for sender and receiver. Insofar as a module can also operate as master, then the circuit of FIG. 8 is also contained. FIGS. 7 to 9 are thus used exclusively to explain the basic principle of the invention. In the following description, it is assumed that all three BIUs 1e, 1m, and 1s were already configured. The following description is adapted to the timing sequence. If one module wants to send a signal, then this will be passed by the functioning part of the module to the BIU 1s (FIG. 9) to a line 2, for example, in the form of a pulse edge which resets a flip-flop 3. The output Q of the flip-flop 3 activates a tri-state gate 4, whose output is connected to the request line 5. This line has a pull-up resistor 6 and is operated in "active low." Thus, several bus users can activate this line 5, simultaneously if necessary. All BIUs of all modules are connected to this common line 5.

The BIU 1m of the current bus master (FIG. 8) recognizes this signal on line 5 and thus knows that "someone has something to report" and triggers an RAK instruction. This signal on the request line 5 goes to the BIU 1m of the master to an arbitration 7, where it is determined when the bus will be free in order to execute the RAK command. This check takes place via the signals "request CPU" and "grant CPU." The signal "request CPU" comes from the CPU of the master and prompts the bus for the CPU of this master. The signal "grant CPU" tells the CPU of the master when the bus is free. If the bus is free, then the arbitration 7 sets a signal "grant BIU" active, so that a start/stop unit 8, which can be a flip-flop, for example, will make the RAK line 13 active and start the VIL cycles. With this signal, a counter 9m is started in the master, which counts the maximum number of RAK cycles corresponding to the configuration in the BIU of the master. During the RAK command, the bus for the CPU of the master is blocked. If the master has set the RAK line 13 to active (enabled), then there proceeds in the BIUs of the sender (FIG. 9) and of the receiver (FIG. 7) in parallel roughly the same process. In both BIUs, a counter 9e and 9s respectively will be started which counts the clock cycles (CLK) on the line 5. The clock is handled here by a clock pulse generator 14 in the BIU of the master, and is sent to all BIUs via a single common clock line 15. The counting of the clock cycles continues until the line 13 is active. The outputs of the counter 9e and 9s are sent to a comparator 10e, 10s and compared with the contents of configured register 16e and 16s respectively. In these registers 16e, 16s the RAK number of the corresponding clock pulse is stored, for which the sender or receiver is configured. As soon as the comparator 10s in the sender's BIU finds an agreement that "its" VIL cycle is reached, then it reports this via a line 12s to a decoder 18s, which is thus activated, and from a register 17s a preprogrammed line number for the VIL is decoded. Thus, one of the output signals 0 . . . 7 of the decoder will be active and specifically the one that corresponds to the configured line number of the bus. Via a tri-state buffer 19 assigned to this output, the state of the signal to be sent is set on the selected bus line D0 . . . D7 and is thus available for all other bus users.

In the BIU of the receiver, via the counter 9e, the comparator 10e and the configuration register 16e, the configured RAK number will be recognized in the same way. A multiplexer 18e, at whose inputs IN 0 . . . IN 7 the bus lines D0 . . . D7 are connected, selects the configured line based on the contents of a configuration register 17e for the line number. The output OUT of the multiplexer 18e thus moves the signal to the configured bus line. This signal is sent to a flip-flop 19, which after a default delay time, which is defined by a delay element 20, clocks the flip-flop 19, at whose output Q the received signal is directed on a line 2e to the module of the receiver. Thus, in order to transfer a signal from the sender to the receiver, in both BIUs the data "configuration RAK No." and "configuration line No." must coincide.

The entire handling of an RAK cycle is controlled by the BIU 1m of the master. In a register 11m the maximum number of RAK cycles or RAK clock cycles is configured and is compared in a comparator 10m with the contents of the counter 9m. If the configured number of clock cycles is reached, then this will be reported by the comparator 10m to the arbitrator 7, which then deactivates the signal "grant BIU," resets the start/stop unit 8, stops the counter 9 and deactivates the RAK signal on the line 13.

In the embodiment of FIGS. 7 to 9, in addition to the request line 5, the RAK line 13 is also shown to which all BIUs are connected. This line is active as long as the RAK cycle is running.

In the above the case was discussed of shortening the RAK cycle, i.e., to let it run only until that cycle in reached which the sender (which has set a bus request), has defined for sending of its signal. Since in the configuration described here, the signal on the line 5 is used only to trigger an RAK command but is no longer needed during the RAK command, this line can be used to indicate a premature termination of the RAK command. In this regard, it can be "frozen" into the sender's BIU at the beginning of the RAK command that it has prompted for a request. For example, at the output of the tri-state gate 4, an additional flip-flop can be provided which stores this state and keeps the line 5 active until the message comes from the comparator 10s that the configured RAK number is reached. Thus, this flip-flop can be reset and the line 5 can be switched inactive, with a delay of one or more clock cycles, if necessary. This can be recognized by the arbitration 7 in the BIU of the master, whereupon via the start/stop unit 8 the RAK cycle will be prematurely terminated. If several modules send a request simultaneously or during one RAK cycle, then the BIU of the sender which is last in line according to the configuration, will keep the line 5 active, which will ensure that all requests are served.

What is claimed is:

1. Method for the exchange of signals between modules connected via a common bus, characterized in that the module (requester) that wishes to send a signal applies a bus request signal to a common line (RQ), in that the module (bus master) that is controlling the bus at this time terminates or interrupts its current bus activity upon receipt of the bus request signal and then sends a confirmation command (RAK) via the bus to all bus users, in that thereupon each module counts clock signals on a common clock line (CLK), where each clock pulse defines a cycle (VAK0 . . . VAKn) and a predetermined cycle (VAKx) is assigned to each module (Mx), and in that the particular module (Mx) that has output the bus request signal during the cycle (VAKx) assigned to it outputs a signal to at least one predefined bus line.

2. Method according to claim 1, characterized in that some or all of the predefined cycles (VAK0 . . . VAKn) are separated from each other by at least one clock pulse that defines a pause.

3. Method according to claim 1 or 2, characterized in that the particular module that has output the bus request signal terminates the bus request signal after expiration of the cycle time assigned to it.

4. Method according to one of claims 1 to 3, characterized in that after receipt of a bus request signal, a cycle sequence with a number of n cycles passes, where n is equal to the number of predefined connections (VIL) divided by the bus width.

5. Method according to one of claims 1 to 3, characterized in that after the reception of a bus request signal from a module (Mx), a cycle sequence is executed with only as many cycles (x) as the number of cycles assigned to the requesting module (Mx).

6. Method according to claim 5, characterized in that in case of simultaneous output of several bus request signals from several modules, as many cycles are executed as correspond to the module whose assigned cycle comes as the last in time.

7. Circuit configuration for the exchange of signals between modules connected to a common bus, characterized in that all modules (M0 . . . Mn) are connected to a common bus request line (RQ), in that each module (M0 . . . Mn) has a bus interface circuit BIU0 . . . BIUn), in that each interface unit (BIU0 . . . BIUn) has a programmable register and a counter which counts clock pulses on a common timing line (CLK), in that each interface unit has a device which sets the common bus request line (BQ) to a predefined level when the module wants to deliver a signal to the bus, in that at least one module (bus master) has a switching unit which constantly monitors the state of the bus request line (RQ), and upon arrival of the predetermined signal, outputs a predefined command to the bus, in that the bus interface units (BIU0 . . . BIUn) of all modules count the clock cycles after this command, in that in the register of each bus interface unit, a clock cycle count assigned to the individual module is stored, and in that the particular module that has output the bus request signal sends a signal to several or all lines (B0 . . . Bn) of the bus after reaching the clock cycle count assigned to it.

* * * * *